A. W. GORDON.
LIFTING JACK.
APPLICATION FILED JULY 24, 1919.
1,348,867.
Patented Aug. 10, 1920.
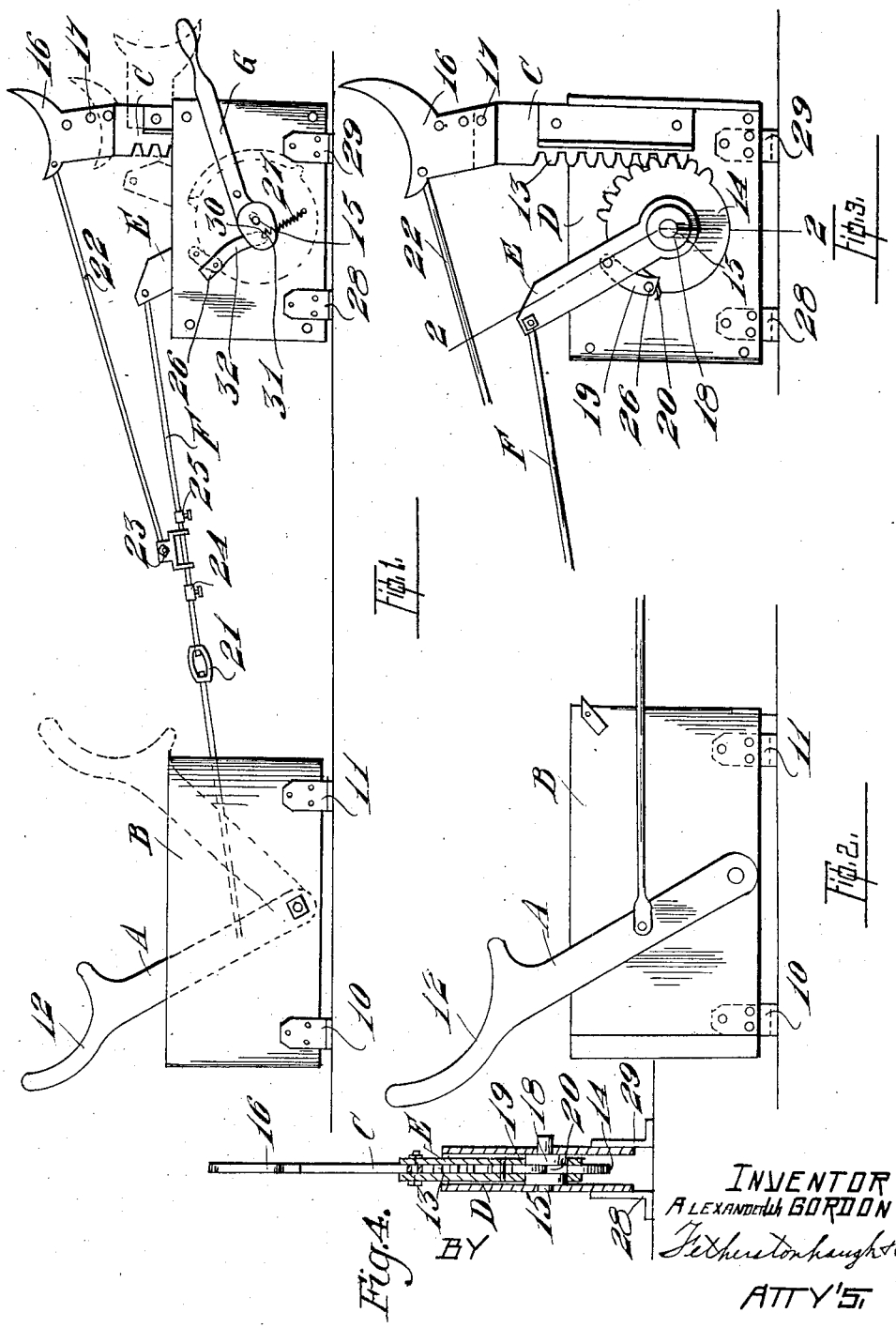

UNITED STATES PATENT OFFICE.

ALEXANDER WILBERFORCE GORDON, OF CROSSFIELDS, ALBERTA, CANADA.

LIFTING-JACK.

1,348,867.  Specification of Letters Patent.  Patented Aug. 10, 1920.

Application filed July 24, 1919. Serial No. 313,126.

*To all whom it may concern:*

Be it known that I, ALEXANDER WILBERFORCE GORDON, a subject of the King of Great Britain, and resident of the village of Crossfields, in the Province of Alberta, Dominion of Canada, have invented certain new and useful Improvements in Lifting-Jacks, of which the following is a specification.

This invention relates to improvements in lifting jacks and the objects of the invention are to provide a simple and effective device for automatically lifting and holding automobiles off the ground and in which the power for the lifting operation may be derived from the automobile itself.

Further objects are to provide a simple and effective device which may be installed in any garage or other convenient place and by which the automobile when stored or not in use may be maintained in position off the ground thereby relieving any strain from the tire and giving free access to the wheels and tire for repairs.

Further objects of the invention are to generally simplify and improve the construction of the various parts to better enable them to perform the functions required of them.

The invention consists essentially of the improved construction hereinafter described in detail in the accompanying specification and drawings forming part of the same.

In the drawings:

Figure 1 is a side elevation of an embodiment of the invention.

Fig. 2 is a side elevation of a portion of the power lever with part of the casing over the same, one side of the casing having been removed to indicate the construction.

Fig. 3 is a side view of the lifting mechanism and casing, part of the casing being removed to more clearly set forth the construction of the same.

Fig. 4 is a sectional elevation on the line 2—2 of Fig. 3.

In the drawings, like characters of reference indicate corresponding parts in the several figures.

Referring to the drawings, A represents the power lever which is pivotally mounted in a casing or frame B, which latter is connected to a floor or other suitable support by brackets 10 and 11.

The lever A is formed at the upper end with a socket 12 designed to engage and receive the front axle of the automobile.

C represents the lifting member for the rear axle, which is mounted with freedom to reciprocate vertically in a casing or frame D being raised or lowered therein by means of a rack 13 on the lifting member which is engaged by a gear or gear segment 14, the latter being mounted on a suitable cross shaft or pin 15 journaled in the side of the frame or casing D.

At the top of the lifting member, a socket member 16 in provided, pivotally connected to the lifting member by a pivot pin 17. The gear 14 is designed to be actuated by an operating lever E having bifurcated ends which are rotatably mounted on cylindrical extensions 18 which form the hub of the gear 14, the operating lever being connected to the gear by means of a pivoted pawl 19 on the lever engaging a suitable tooth or recess 20 on the gear.

The operating lever is connected to the power lever by means of a connecting rod F, the length of which may be adjusted by a turn buckle 21. The pivot socket 16 is also controlled by the power lever by means of a connecting rod 22 which is pivotally connected to a sleeve bracket 23, slidably mounted on the rod F and free to reciprocate between fixed collars or stops 24 and 25 which may be provided with set screws for holding them in adjusted position.

To release the lifting member when raised, a trip lever G is provided pivotally mounted intermediate of its length on the casing D, and provided on the shorter arms with a slot 30 through which the pin 31 carried by the detent lever 32 passes.

The upper end of the detent lever 32 is offset and passes through a slot in the side wall of the casing D, so that the said offset end engages under certain circumstances with the pin 26 carried by the pawl 19, and on actuation of the trip lever the pawl 19 will be released from the tooth 20 of the gear 14 thus allowing the member C to be lowered under gravity.

The pin 31 is connected to one end of the spring 27 the other end of which is anchored to the casing D.

When in operation two jacks are required, one being situated at each side of the automobile about to be lifted.

The jack when about to be used is in the position shown in Fig. 1 with the lever A and the socket member 16 of the lifting member C in the positions indicated by the dotted lines.

The automobile is driven over the lifting member, and the front axle of the automobile is engaged with the socket 12 of the power lever A, which will rotate about its pivotal point and raise the front wheels off the floor, while at the same time the socket 16 is rotated into position shown by the full lines in Fig. 1, and engaged with the rear axle being raised subsequently by the elevation of the lifting member C.

The actuation of the member C is performed by the rod F exerting a pull on the lever E thereby rotating a gear 14 and elevating the member C to raise the driving wheels of the automobile from the floor.

The jack, when the automobile is elevated, occupies the position represented by the full lines in Fig. 1, in which it will be seen that the offset ends of the detent lever will, on actuation of the trip lever G, be engaged with the pin 26 of the pawl 19, and thus disengaged the pawl from the tooth 20 of the gear 14 allowing the automobile to be lowered under gravity to the floor.

As many changes could be made in the above construction and many apparently widely different embodiments of my invention within the scope of the claims constructed without departing from the spirit or scope thereof, it is intended that all matter contained in the accompanying specification and drawings shall be interpreted as illustrative and not in a limiting sense.

What I claim as my invention is:

1. In a lifting jack and in combination, a power lever adapted to be engaged by the front axle of an automobile, a lifting member adapted to engage the rear axle thereof, a rack on the lifting member, a gear engaged with the rack, an operating lever, a pawl on the operating lever engaging the gear, and means for operating the operating lever from the power lever.

2. In a lifting jack and in combination, a power lever adapted to be engaged by the front axle of an automobile, a lifting member adapted to engage the rear axle thereof, a rack on the lifting member, a gear engaged with the rack, an operating lever, a pawl on the operating lever engaging the gear, means for operating the operating lever from the power lever, a pivoted socket on the lifting member and means controlled by the power lever for swinging the said socket.

3. In a lifting jack and in combination, a power lever adapted to be engaged by the front axle of an automobile, a lifting member adapted to engage the rear axle thereof, a rack on the lifting member, a gear engaged with the rack, an operating lever, a pawl on the operating lever engaging the gear, means for operating the operating lever from the power lever, and a trip lever adapted to control the pawl on the operating lever.

4. In a lifting jack and in combination, a power lever adapted to be engaged by the front axle of an automobile, a lifting member adapted to engage the rear axle thereof, a rack on the lifting member, a gear engaged with the rack, an operating lever, a pawl on the operating lever engaging the gear, and means for operating the operating lever from the power lever, said means including the connecting rod having a turn buckle therein.

5. In a lifting jack and in combination, a power lever adapted to be engaged by the front axle of an automobile, a lifting member adapted to engage the rear axle thereof, a rack on the lifting member, a gear engaged with the rack, an operating lever, a pawl on the operating lever engaging the gear, a connecting rod extending between the operating lever and the power lever, a pivoted socket on the lifting member, and a connecting rod extending between the said socket and the first mentioned connecting rod and having an adjustable connection therewith.

6. In a lifting jack and in combination, a power lever adapted to be engaged by the front axle of an automobile, a lifting member adapted to engage the rear axle thereof, a rack on the lifting member, a gear adapted to engage with the rack, an operating lever, a pawl on the operating lever engaging the gear, a connecting rod extending between the operating lever and the power lever, a pivoted socket on the lifting member, and a connecting rod extending between the said socket and the first mentioned connecting rod and having an adjustable connection therewith, the said adjustable connection comprising a sliding lever, bracket and adjustable stops.

7. In a lifting jack and in combination, a power lever, adapted to be engaged by the front axle of an automobile, a lifting member adapted to engage and lift the rear axle, an operating lever, releasable means for actuating the lifting member through the operating lever, and a connection rod between the operating lever and the power lever.

8. In a lifting jack and in combination, a power lever adapted to be engaged by the front axle of an automobile, a lifting member adapted to engage and lift the rear axle, an operating lever, releasing means for actuating the lifting member through the operating lever, a connecting rod between the operating lever and the power lever, a pivoted socket on said lifting member, a connecting rod between said socket and the first mentioned connecting rod.

9. In a lifting jack and in combination a power lever adapted to be engaged by the front axle of an automobile, a lifting member adapted to engage the rear axle thereof, an operating lever, an operative connection extending between the power lever and the operating lever, a releasable actuating connection extending between the operating lever and the lifting member for elevating and engaging the latter with the rear axle, and means for releasing said releasing connection.

10. In a lifting jack and in combination, a power lever adapted to be engaged by the front axle of an automobile, a vertically movable lifting member adapted to engage the rear axle thereof, releasable means establishing an operative connection between the power lever and the lifting member whereby movement of the power lever in one direction by engagement with the front axle of the vehicle will cause elevation of the lifting member and engagement of the latter with the rear axle of the vehicle, and manually operable means for releasing said connection to permit the lifting member to gravitate to a lowered position.

In witness whereof I have hereunto set my hand in the presence of two witnesses.

ALEXANDER WILBERFORCE GORDON.

Witnesses:
F. C. BLISS,
D. ONTKES.